(No Model.)
W. H. MORRISON.
BALL AND SOCKET JOINT FOR BOOK SUPPORTS.
No. 485,471. Patented Nov. 1, 1892.
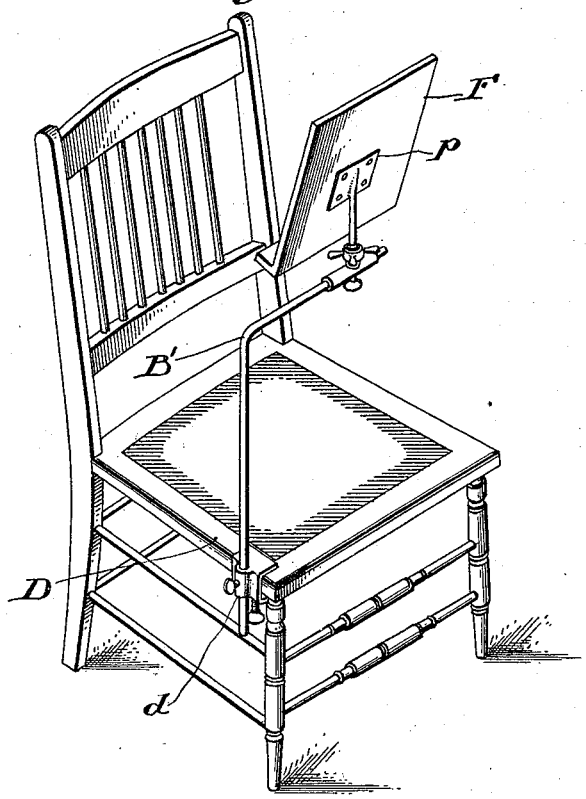
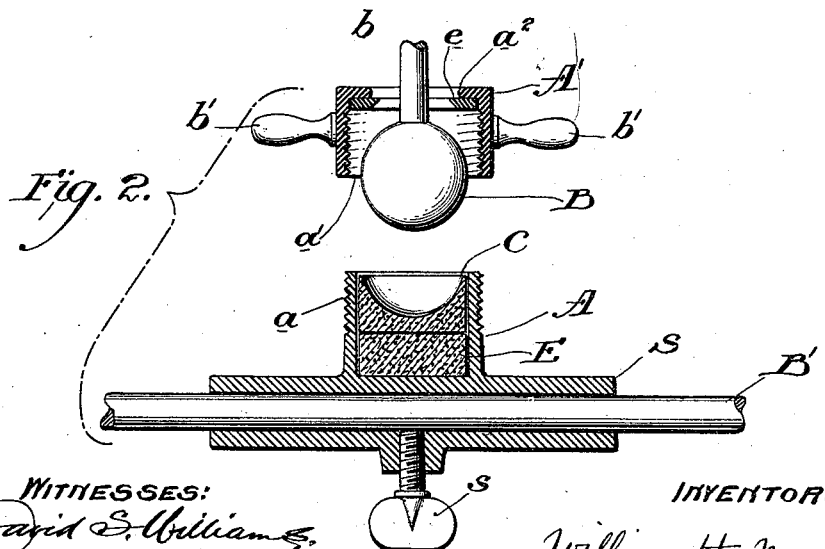

UNITED STATES PATENT OFFICE.

WILLIAM H. MORRISON, OF PHILADELPHIA, PENNSYLVANIA.

BALL-AND-SOCKET JOINT FOR BOOK-SUPPORTS.

SPECIFICATION forming part of Letters Patent No. 485,471, dated November 1, 1892.

Application filed April 2, 1892. Serial No. 427,439. (No model.)

*To all whom it may concern:*

Be it known that I, WILLIAM H. MORRISON, of the city of Philadelphia and State of Pennsylvania, have invented a certain new and useful Improvement in Ball-and-Socket Joints for Book-Supports; and I do hereby declare the following to be a full, clear, and exact description thereof, reference being had to the accompanying drawings, forming part of this specification.

My invention has relation to the construction of ball-and-socket joints principally for book-supports; and it consists in a casing or socket provided with an adjustable screw-threaded cap adjusted on the casing or socket by means of screw-threads, a ball provided therein, and a shank secured to said ball or integral therewith, protruding through an orifice provided in the cap for the purpose large enough to allow of the universal movement of the ball, a concave seat or cushion constructed as a seat for the ball provided within the casing of slightly-compressible material, said ball-seat of slightly-compressed material being preferably supported upon a bed or cushion of soft rubber provided below said seat within said casing, and a movable washer preferably provided above the ball in the upper part of the adjustable cap, as hereinafter particularly described.

The object of my invention is to provide an improved tension-regulated ball-and-socket joint adapted principally in constructions of book-supports, so that the book or support may when the tension is properly regulated be shifted to any desired angle or position and retained in that position by a mere adjustment of the table proper without manipulating any thumb-screw or any other adjustable device, or even adjusting the tension device.

In the accompanying drawings similar letters of reference refer to similar parts.

Figure 1 is a perspective view of a book-support attached to a chair containing my improved tension-regulated ball-and-socket joint. Fig. 2 is a sectional view of the parts detached.

A is the casing or socket, properly supported upon a sleeve S, adapted to slide and be secured upon the supporting-arm B' by the thumb-screw s. The adjustable cap or upper section A' of the casing A is provided internally with screw-threads $a'$, which are adapted to engage with the screw-threads $a$, provided on the exterior of the casing A. The lugs or projections $b'$ are provided on the exterior of the cap or section A' for readily turning it and tightening or releasing the tension when engaged on the casing A. The ball B, adjusted in the casing A A', is provided rigidly with a shank $b$, which protrudes through an orifice $a^2$, provided in the upper portion of the cap or section A' of a diameter sufficiently large to allow of a universal movement of the ball B. The ball B is seated in a concave seat C of hard compressible material, while the seat C is supported within the casing A on an elastic cushion E, preferably constructed of soft rubber. A washer $e$ is provided in the upper part of the cap or section A' above the ball B, engaged in position by the upper portion of the cap A', forming a shoulder, the orifice in the washer $e$ being preferably equal to or slightly smaller than the orifice $a^2$ of the cap A'. The shank $b$ is secured to the table F of the book-support, as through the medium of the plate $p$, and the lower end of the supporting-arm B' is secured to the seat of the chair D by means of a clamp $d$ or other suitable means. When in position, the cap or section A' is turned down on the screw-threads $a$ $a'$ until the ball B binds between the compressible seat C and the upper washer $e$. If a heavy book is placed on the table F, or if the same is to be used for writing, the tension is increased by screwing the cap-section A' upon the casing A more tightly, thus compressing the ball B upon the compressible seat C and indirectly upon the elastic cushion E, binding the said ball B tightly between said seat C and the washer $e$. The friction between the outer surface of the ball B and the surface of the compressible seat C and washer $e$, increased by the elasticity of the cushion E, will retain the table F in any desired position, though at the same time the table and book may be shifted by a simple movement of the hand to any other possible position without changing the tension when once properly adjusted. The table or support is thus held firmly in that position, as the compressible seat C and the elastic cushion E will give as the table is moved by the hand, but immediately when released will retain the ball frictionally in any given position. The washer *e* is preferably employed, so that it may move with the ball B upon being shifted without moving the cap-section A', and thus releasing the tension, as would occasionally occur where the ball is moved when bearing directly against the upper shoulders of the sections A', though the washer *e* may be eliminated.

It will be seen that the base of the compressible seat should be provided upon or composed of a material of greater elasticity than the inner surface of the concave of the seat in which the ball B is provided, and that the parts may be vulcanized to different degrees of hardness. I have also described my invention as particularly applicable to book-supports; but I do not limit myself to this use, as my invention may be applied to other uses.

Having thus described my invention, what I claim, and desire to secure by Letters Patent, is—

1. A tension-regulated ball-and-socket joint having the adjustable casing-sections A A', adjustable upon each other through the medium of the screw-threads *a a'*, and lugs *b'*, provided on the casing A' for regulating the adjustment-ball B, having rigid shank *b* secured thereto, provided within the casing, and elastic concaved seat C, supported upon the elastic cushion or bed E, provided in the casing A, substantially as described.

2. In a book-support, in combination with a supporting-arm B' and clamp *d*, a tension-regulated ball-and-socket joint having the adjustable sections A A', adjusted upon each other through the medium of the screw-threads, and the rigid lugs *b'*, ball B, having rigid shank *b* provided thereon, said shank protruding through orifice $a^2$, provided in the upper section A', said shank *b* secured at its upper end to the book-support F, elastic concaved seat C, and supporting elastic cushion E, provided within the casing A, and washer *e*, secured within the casing A', above the ball B, substantially as and for the purposes set forth.

In witness whereof I have hereunto set my hand this 31st day of March, A. D. 1892.

WILLIAM H. MORRISON.

Witnesses:
J. BAYARD HENRY,
HORACE PETTIT.

It is hereby certified that in Letters Patent No. 485,471, granted Novem..
upon the application of William H. Morrison, of Philadelphia, Pennsylvania,..
improvement in "Ball-and-Socket Joints for Book-Supports," errors appear in th..
printed specification requiring correction, as follows: In line 24, page 1, the word
"compressed" should read *compressible;* and in line 30, page 2, the hyphen between
the words "adjustment" and "ball" should be stricken out and a comma inserted
instead and that said Letters Patent should be read with these corrections therein that
the same may conform to the record of the case in the Patent Office.

Signed, countersigned, and sealed this 8th day of November, A. D. 1892.

[SEAL.]

CYRUS BUSSEY,
*Assistant Secretary of the Interior.*

Countersigned:
 N. L. FROTHINGHAM,
  *Acting Commissioner of Patents.*